United States Patent

[11] 3,619,461

| [72] | Inventor | Frank P. Gay<br>Wilmington, Del. |
|---|---|---|
| [21] | Appl. No. | 811,688 |
| [22] | Filed | Mar. 25, 1969 |
| [45] | Patented | Nov. 9, 1971 |
| [73] | Assignee | E. I. du Pont de Nemours and Company<br>Wilmington, Del.<br>Continuation of application Ser. No.<br>472,658, July 16, 1965, now abandoned. |

[54] STRETCHING PROCESS FOR POLYIMIDE FILM
2 Claims, No Drawings

[52] U.S. Cl. .................................................. 264/288,
264/289, 260/47 CP, 260/78 S, 260/78 TF
[51] Int. Cl. .................................................. B29d 7/24
[50] Field of Search .................................................. 264/288,
289, 210, 288, 289, 210; 260/78 TF, 78 S, 47 CP

[56] References Cited
UNITED STATES PATENTS

| 2,547,763 | 4/1951 | Land et al. | 264/288 |
|---|---|---|---|
| 2,896,262 | 7/1959 | Hermann | 264/288 |
| 3,179,614 | 4/1965 | Edwards | 260/30.2 |
| 3,179,630 | 4/1965 | Endrey | 260/78 |
| 3,179,632 | 4/1965 | Hendrix | 260/78 |
| 3,413,267 | 11/1968 | Kreuz | 260/78 |

FOREIGN PATENTS

| 591,604 | 1/1960 | Canada | 264/288 |
|---|---|---|---|

*Primary Examiner* — Julius Frome
*Assistant Examiner* — Herbert Mintz
*Attorney* — John E. Griffiths

ABSTRACT: A process of immersing in a volatile liquid a polyimide film of low volatile content, and heating and stretching or restraining the treated film to increase the orientation in at least one direction.

STRETCHING PROCESS FOR POLYIMIDE FILM

CROSS-REFERENCE TO RELATED APPLICATION

This application is a continuation of U.S. Pat. application Ser. No. 472,658, filed July 16, 1965, and now abandoned.

This invention relates to polyimide films.

According to the present invention it has been found that the processability of handleability, such as is involved in the orienting, of polyimide films, which films have a relatively low level of content of volatile components, such as on the order of less than 10 or 15 percent by weight based on the total weight of the film including any volatiles that are present, can be improved by increasing the volatile content by the process of the present invention.

The invention comprises the process of taking a polyimide film having a volatile content of less than about 15 percent by weight, and usually less than about 0.5 or 1.0 percent by weight, and immersing said film in a volatile organic liquid for a time sufficient to increase the volatile content of said polyimide film.

In a preferred aspect, the invention comprises taking the soaked or wetted polyimide film having the increased volatile content and orienting said film by heating the film under conditions such that no substantial amount of shrinkage of said film occurs in at least one direction of said film, at a temperature and for a time sufficient to give a film having an inherent viscosity of at least 0.5, measured as an 0.5 percent by weight solution in fuming nitric acid at 15° C., and an orientation angle as measured in said direction of less than 75°. It will be understood that the orientation can be effected either by controlled heating of the film while the film is under absolute restraint to prevent shrinkage or by a positive stretching operation with controlled heat treatment. It will be understood that in each of these approaches the film is maintained under conditions such that no substantial shrinkage occurs in at least one direction.

Ordinarily, the volatile content of the finished oriented film will be less than 5 percent, preferably less than 1.5 percent, and most preferably less than 0.5 percent. The films can be either heat shrinkable or dimensionally stable.

The oriented films obtainable by the processes of this invention are further described in Berr and Tink U.S. Pat. application Ser. No. 44,382 filed Mar. 31, 1965 and assigned to the same assignee as that of the present application and now abandoned. The entire disclosure of such application is hereby incorporated by reference.

The polyimide films which are usefully treated according to the present invention are known. Such films are composed of at least one polymeric imide and/or a polymeric polyamide-acid, polyamide-acid salts, polyamide-amide and/or polyamide-ester precursor convertible to the polymeric imide. It will be understood that these terms are used herein in their broad sense and are intended to include homopolymers, copolymers, blends or mixtures of homopolymers and/or copolymers, and any and all of these containing fillers, additives, modifying agents such as plasticizers, pigments, dyes, lubricants, etc.

Representative polymeric imides and precursors, their preparation and use, are the subject of a number of United States patent applications assigned to the same assignee as that of the present application. It is intended that the entire disclosure of each of such applications now to be identified in this paragraph is incorporated herein by reference. A large number of polyamide-acids, both aliphatic and aromatic, and their thermal conversion to the corresponding polyamides, are described in Edwards U.S. application Ser. No. 95,014 filed Mar, 13, 1961 and now U.S. Pat. No. 3,179,614. A preferred number of aromatic polyamide-acids and their thermal and/or chemical conversion to the corresponding polyamides and described in Edwards U.S. application Ser. No. 169,120 filed Jan. 26, 1962 and now U.S. Pat. No. 3,179,634 and Endrey U.S. application Ser. No. 169,119 filed Jan. 26, 1962 and now U.S. Pat. No. 3,179,633. Useful polyamide-amides and their conversion to the corresponding polyamides are described in Angelo and Tatum U.S. application Ser. No. 325,442 filed Nov. 21, 1963 and now U.S. Pat. No. 3,316,212. Useful polyamide-esters and their conversion to the corresponding polyamides are described in Sorenson U.S. application Ser. No. 288,535 filed June 17, 1963 and now U.S. Pat. No. 3,312,663; Angelo U.S. application Ser. No. 311,307 filed Sept. 25, 1963 and now U.S. Pat. No. 3,316,211; Angelo U.S. application Ser. No. 311,326 filed Sept. 25, 1963 and now U.S. Pat. No. 3,282,897; Tocker U.S. application Ser. No. 332,889 filed Dec. 23, 1963 and now U.S. Pat. No. 3,326,851; and Tatum U.S. application Ser. No. 325,497 filed Nov. 21, 1963 and now U.S. Pat. No. 3,261,811.

Useful copolyamide-acids and their conversion to the corresponding copolyimides are described in Taylor U.S. application Ser. No. 427,160 filed Jan. 21, 1965 and now abandoned; Gall U.S. application Ser. No. 331,353 filed Dec. 18, 1963 and now U.S. Pat. No. 3,264,250; and Angelo U.S. application Ser. No. 398,784 filed Sept. 23, 1964 and now U.S. Pat. No. 3,424,718. Useful blends of polyamide-acids and/or their corresponding polyimides are described in Abramo U.S. application Ser. No. 417,242 filed Dec. 9, 1964 and now U.S. Pat. No. 3,342,897. Other useful polymers are those containing both amide and imide linkages in the polymer chain such as those described in British Patent specification No. 570,858.

As will therefore be readily understood, the present invention is primarily related to films of the polymeric materials referred to in the preceding paragraph, as well as related polymeric materials of which the foregoing are representative, the polyimide (which term is intended to include the foregoing) having the recurring unit:

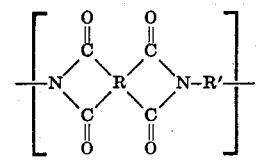

wherein

R is an organic tetravalent radical containing at least two carbon atoms, no more than two of the indicated carbonyl groups of each unit being attached to any one carbon atom of said tetravalent radical;

R' is a divalent radical containing at least two carbon atoms, the two indicated valences of R' being on separate carbon atoms of said divalent radical.

A preferred such polyimide is of a polymer of bis(4-aminophenyl) ether and pyromellitic dianhydride.

The volatile component, if any, present in the polyimide film treated according to the present invention will ordinarily be solvent used in the polymerization preparation of the polyimide. However, the original volatile content can be any or many of any types of volatile substance regardless of its nature which is removable on heating. It includes not only materials which may be in the film from earlier stages of processing, such as the solvent or polymerization medium, converting agents, byproducts, catalysts, and the like, but also a variety of liquids which may be in the film as diluent for a converting agent, a catalyst, or any other material, or as a leftover of a solvent exchange or washing operation.

Illustrative but not exhaustive of the volatiles which can be in the films can be mentioned all of the solvents and volatile materials mentioned in any of the U.S. patent applications identified above. Typical of such materials are the following: N,N-dialkylcarboxylamides such as N,N-dimethylformamide, N,N-diethylformamide, N,N-dimethylacetamide, N,N-diethylacetamide, N,N-dimethylmethoxy acetamide, N-methyl caprolactam, etc.; dimethylsulfoxide, N-methyl-2-pyrrolidone, tetramethylene urea, pyridine, dimethylsulfone, hexamethylphosphoramide, tetramethylene sulfone, formamide, N-methylformamide, butyrolactone and N-acetyl-2-pyrrolidone; saturated hydrocarbons such as hexane, cyclohexane, decane, etc.; aromatic hydrocarbons such as benzene, toluene, xylene, naphthalene, etc.; ethers such as diethyl ether, tetrahydrofuran, dioxane, anisole, etc.; nitriles such as acetonitrile, benzonitrile, etc.; esters such as butyl acetate, ethyl propionate, etc.; ketones such as methyl ethyl ketone, acetophenone, etc.; anhydrides such as acetic anhydride, propionic anhydride, benzoic anhydride, ketene, etc.; carboxylic acid such as acetic acid, butyric acid, benzoic acid, etc.; tertiary amines such as pyridine, isoquinoline, 3,5-lutidine, N,N-dimethyldodecylamine, N-ethylmorpholine, N,N-dimethylcyclohexylamine, etc.; phenols such as phenol, p-cresol, 2,5-xylenol, etc.; alcohols such as methanol, ethanol, hexyl alcohol, benzyl alcohol, etc.; halogenated compounds such as chloroform, methylene chloride, carbon tetrachloride, trichlorotrifluoroethane, chlorobenzene, bromobenzene, etc.; volatile plasticizers such as diethyl phthalate, dimethyl suberate, etc.; dimethyl cyanamide; water; etc.

According to one aspect of the present invention, the volatile content of the polyimide film can be increased by introducing the volatile substance into the film such as by wetting, soaking, or immersing the film in liquid volatile, or by exchanging the volatile substance for another already in the film. This latter approach will be useful for introducing into the film those volatiles which will not readily be imbibed or soaked into the film.

The introduction of the volatile into the film can be carried out at a temperature up to the decomposition temperature of the polyimide film. Ordinarily, temperatures from about room temperature up to 300° or 400° C. will be satisfactory. The particular temperature used for any given circumstance will of course depend upon such factors as the particular polyimide, the duration of treatment, film thickness, the nature of the effect desired, and the particular volatile involved, with relatively higher temperatures being desirable for the relatively less volatile substances. Ordinarily, treatment times up to one-half to 1 hour will effect some improvement and times up to 4 or 5 hours will be adequate.

The film can be oriented, as mentioned above, either by controlled heating while the film is under restraint preventing shrinking or by a positive stretching with controlled heat treatment. Orientation in one or both directions by these techniques can be carried out at a temperature in the range from about room temperature up to about the boiling point of the volatile in the film. Ordinarily, temperatures up to about 100° or 150° C. will be suitable. The positive stretching amount will depend on such factors as the particular polyimide, the film thickness, the nature of the effect desired and can range from a slight amount up to five or six times or more its initial dimensions. For biaxially oriented film, stretch ratios of about 3X by 3X are suitable.

The film product following orientation as just described will have some level of residual solvent and will be to a greater or less extent shrinkable upon exposure to elevated temperatures. Such films can be made more dimensionally stable by heat setting by conventional procedures, e.g., heat treating at a temperature above about 200° C. up to the decomposition temperature of the film while restraining the film to prevent shrinkage.

This invention will be more clearly understood by reference to the following examples. These examples illustrate specific embodiments of the present invention and should not be construed to limit the invention in any way.

EXAMPLE 1

An amorphous sample of 15-mil polyimide film (based on 4,4'-diaminophenyl ether and pyromellitic acid) previously dried at a maximum of 325° C. was soaked in m-cresol for 30 minutes at room temperature. The sample was washed with acetone to remove excess m-cresol from its surface. The swollen film was then stretched 5X in one direction at room temperature, and dried under restraint at 125° C. in order to preserve the length of the sample. The dried film exhibited birefringence between cross polaroids, thus indicating that the sample was oriented. If at any stage before the sample is dry the restraining force is released, the sample is seen to be heat shrinkable.

EXAMPLE 2

Example 1 was repeated, using phenol in place of m-cresol, with substantially the same results.

EXAMPLE 3

Example 1 was repeated, using benzyl alcohol in place of m-cresol, with substantially the same results.

EXAMPLE 4

Example 1 was repeated, except that the sample was soaked in m-cresol at 100° C. for 5 minutes, with substantially the same results.

EXAMPLES 5, 6 and 7

Example 1 was repeated, except that the sample was soaked in P-cresol, salicylaldehyde and methyl salicylate respectively at 25° C. for 2 hours, with substantially the same results.

EXAMPLES 8, 9 and 10

The same film as used in example 1 was soaked in anisole, N,N-dimethylaniline and a solution of 2 percent by weight lithium bromide in N,N-dimethylacetamide at 25° C. for 2 hours. The softened films were drawable.

EXAMPLES 11, 12 and 13

Example 1 was repeated, with the additional step that the m-cresol swollen film was then subsequently soaked in acetone or methylene chloride to exchange the imbibed liquid. The films were then stretched and dried in the same way, with substantially the same results.

EXAMPLE 14

Example 1 was repeated, using methylene chloride in place of m-cresol, with substantially the same results.

EXAMPLE 15

A crystalline sample of 1.45-mil polyimide film, (based on 4,4'-diaminodiphenyl ether and pyromellitic acid) previously dried at a maximum temperature of 400° C. was soaked in benzyl alcohol, washed with acetone, stretched 2.5X in the machine direction by 1.74X in the transverse direction at room temperature, and dried under restraint. The oriented film, 0.6 mils thick, was improved in toughness, as shown by the following data:

|  | Initial | | Oriented | |
| --- | --- | --- | --- | --- |
|  | MD | TD | MD | TD |
| Modulus, K p.s.i. | 399 | 389 | 433 | 388 |
| Tensile, K p.s.i. | 37.5 | 23 | 24.7 | 36.3 |
| Elongation, % | 172 | 180 | 73 | 98 |

In this process, the orientation of the sample increased.

EXAMPLE 16

Example 15 was repeated except that cresol was used in place of benzyl alcohol and the sample was stretched at 100° C. The results were substantially the same.

What is claimed is:

1. A process for the treatment of polyimide film by contacting a film consisting essentially of the polypyromellitimide of 4,4'-diaminodiphenyl ether with a liquid selected from the group consisting of phenol, m-cresol, p-cresol, benzyl alcohol, salicylaldehyde, methyl salicylate, anisole, N,N-dimethylaniline, methylene chloride, and a 2 percent solution of lithium bromide in N,N-dimethylacetamide at a temperature of about from 25° to 100° C.; for a period of about from 5 minutes to 2 hours; film in at least one of two mutually perpendicular directions up to about 5X at a temperature of about from 25° to 100° C.; and drying the film by heating under restraint.

2. A process of claim 1 further comprising contacting the film with a second liquid selected from acetone and methylene chloride before stretching the film and after contacting the film with the liquid, whereby the liquid is at least partly replaced by the second liquid.

* * * * *

PO-1050
(5/69)

UNITED STATES PATENT OFFICE
CERTIFICATE OF CORRECTION

Patent No. 3,619,461   Dated November 9, 1971

Inventor(s)   Frank P. Gay

It is certified that error appears in the above-identified patent and that said Letters Patent are hereby corrected as shown below:

Column 1, line 44, "Ser. No. 44,382" should read --Ser. No. 444,382--.

Column 1, line 70, "polyamides" should read --polyimides--.

Column 2, line 1, "polyamides" should read --polyimides--.

Column 2, line 4, "polyamides" should read --polyimides--.

Column 4, line 25, "P-cresol" should read --p-cresol--.

Column 4, line 60, the Table should appear as follows:

|                   | Initial |      | Oriented |      |
|                   | MD      | TD   | MD       | TD   |
|-------------------|---------|------|----------|------|
| Modulus, K p.s.i. | 399     | 389  | 433      | 388  |
| Tensile, K p.s.i. | 23      | 24.7 | 37.5     | 36.3 |
| Elongation, %     | 172     | 180  | 73       | 98   |

Column 5, line 9, --stretching the-- should be inserted before "film".

Signed and sealed this 2nd day of May 1972.

(SEAL)
Attest:

EDWARD M. FLETCHER, JR.
Attesting Officer

ROBERT GOTTSCHALK
Commissioner of Patents